(12) United States Patent
Linebarger et al.

(10) Patent No.: US 7,916,693 B2
(45) Date of Patent: *Mar. 29, 2011

(54) SYSTEM AND METHOD FOR SELECTING SPECTRUM

(75) Inventors: John W. Linebarger, Charlotte, NC (US); Durga P. Satapathy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 61 days.

This patent is subject to a terminal disclaimer.

(21) Appl. No.: 12/368,059

(22) Filed: Feb. 9, 2009

(65) Prior Publication Data

US 2009/0143025 A1  Jun. 4, 2009

Related U.S. Application Data

(63) Continuation of application No. 10/020,062, filed on Oct. 30, 2001, now Pat. No. 7,512,094.

(51) Int. Cl.
 *H04W 4/00* (2009.01)
(52) U.S. Cl. ...................................................... 370/329
(58) Field of Classification Search .......... 370/329–330, 370/335–345, 347–348, 436–447
See application file for complete search history.

(56) References Cited

U.S. PATENT DOCUMENTS

| 6,389,059 | B1 * | 5/2002 | Smith et al. | 375/141 |
| 6,922,559 | B2 * | 7/2005 | Mohammed | 455/421 |
| 7,512,094 | B1 * | 3/2009 | Linebarger et al. | 370/329 |
| 2004/0192211 | A1 * | 9/2004 | Gallagher et al. | 455/67.11 |

* cited by examiner

*Primary Examiner* — Thai D Hoang

(57) ABSTRACT

A system and method comprise a spectrum selector, an unlicensed transceiver, and a licensed transceiver. The spectrum selector determines whether communications will be transmitted over unlicensed spectrum or licensed spectrum. Based upon the determination, the spectrum selector transmits the communications to the unlicensed transceiver or the licensed transceiver. In addition, the spectrum selector may transmit a first portion of the communications to die unlicensed transceiver and a second portion of the communications to the licensed transceiver. On the receiving side, the spectrum selector monitors the unlicensed transceiver and the licensed transceiver, receives the communications from the licensed transceiver and/or the unlicensed transceiver, and transmits the communications to an access device. The unlicensed transceiver transmits and/or receives communications over unlicensed spectrum. The licensed transceiver transmits and/or receives communications over licensed spectrum.

19 Claims, 2 Drawing Sheets

SYSTEM AND METHOD FOR SELECTING SPECTRUM

RELATED APPLICATIONS

This application is a continuation application of prior U.S. patent application Ser. No. 10/020,062, filed Oct. 30, 2001, and entitled "SYSTEM & METHOD FOR SELECTING SPECTRUM", which is hereby incorporated by reference herein in its entirety.

FEDERALLY SPONSORED RESEARCH OR DEVELOPMENT

Not Applicable

MICROFICHE APPENDIX

Not Applicable

FIELD OF THE INVENTION

The present invention relates to the field of wireless spectrum.

BACKGROUND OF THE INVENTION

Wireless communications currently are used in a number of communication systems. These wireless systems have the advantage of not requiring fiber or other cable to carry the communications. However, wireless spectrum shortage is a major constraint on a system designed for the wireless communication system. For example, spectrum shortage increasingly constrains designs for high data rate multi-media service delivery. Thus, a new system and method are needed that increases the ability for wireless communication systems to effectively and efficiently deliver wireless communications. The system and method of the present invention fulfill these and other needs.

SUMMARY OF THE INVENTION

The present invention is directed to a system for selecting spectrum comprising a licensed spectrum transceiver configured to communicate over licensed spectrum and an unlicensed spectrum transceiver configured to communicate over unlicensed spectrum. A spectrum selector configured to select the licensed transceiver or the unlicensed transceiver for communication.

The present invention further is directed to a system for selecting spectrum comprising a medium access control layer configured to control access for a communication to unlicensed spectrum or licensed spectrum. The system further comprises a differentiator configured to format the communication for communication over the unlicensed spectrum or the licensed spectrum.

Further, the present invention is directed to a method for selecting spectrum comprising configuring a licensed spectrum transceiver to communicate over licensed spectrum and configuring an unlicensed spectrum transceiver to communicate over unlicensed spectrum. A spectrum selector is configured to select the licensed transceiver or the unlicensed transceiver for communication.

Still further, the present invention is directed to a method for selecting spectrum comprising configuring a licensed spectrum transceiver to communicate over licensed spectrum and configuring an unlicensed spectrum transceiver to communicate over unlicensed spectrum. A spectrum selector selects the licensed transceiver for operation in a primary mode and to select the unlicensed transceiver for operation in a backup mode. The method further comprises selecting operation for the backup mode when interference occurs for the primary mode and selecting operation for the primary mode when interference does not occur for the primary mode.

DETAILED DESCRIPTION

Licensed spectrum is used in wireless communication systems to provide guaranteed services and other services. The licensed spectrum is a known commodity and can be regulated by its licensee. However, the licensed spectrum can be limited and often is expensive to use. For example, in multipoint multichannel distribution service (ADDS) communication systems, only 33 channels exist, each at 6 megahertz (Mhz). Of the 33 channels, twenty of the channels are instructional fixed television services (ITFS) that are allocated to ITFS users but can be sublicensed with additional constraints to other users.

However, a considerable amount of unlicensed spectrum exists that can be used for free by communication systems. For example, these unlicensed bands include unlicensed personal communication services (UPCS), industrial scientific medical (ISM), and unlicensed national information infrastructure (UNII). The unlicensed spectrum is extensive, providing a cost-effective and widely available wireless communication transport.

The system and method of the present invention use a combination of licensed and unlicensed spectrum to enable a significant increase in available throughput for wireless communications. The use of unlicensed spectrum enables a communication system to increase coverage beyond what is provided by the available licensed spectrum.

The system and method are configured to operate with licensed and unlicensed spectrum in a variety of modes, including a switching mode and a capacity mode. The switching mode is used to switch between, and allocate resources for, guaranteed services and best effort services, either in the same or different spectrum. The capacity mode uses the available capacity in one spectrum and uses other spectrum for additional capacity. The system and method are especially viable for last-mile wireless access.

Figure 1:
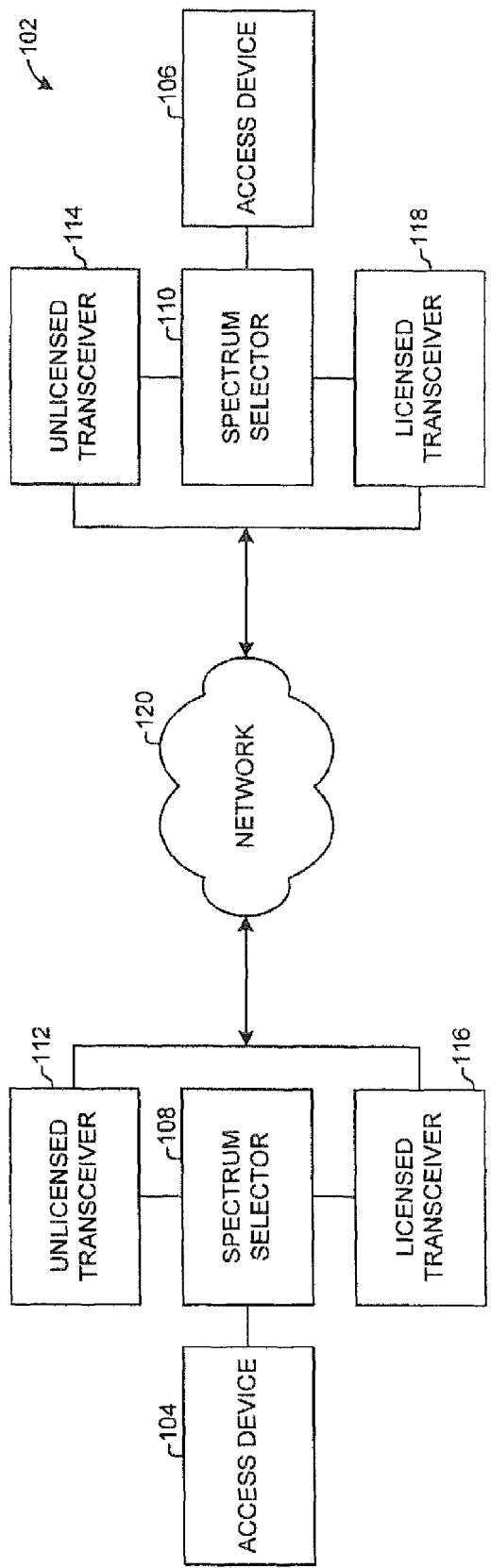
FIG. 1 is a block diagram of a communication system in accordance with an embodiment of the present invention.

FIG. 1 depicts an exemplary embodiment of a communication system of the present invention. The communication system 102 of FIG. 1 comprises access devices 104 and 106, spectrum selectors 108 and 110, unlicensed transceivers 112 and 114, and licensed transceivers 116 and 118 communicating via a network 120. It will be appreciated that only one access device, spectrum selector, unlicensed transceiver, and licensed transceiver are required for a communication system. However, for ease of discussion multiple devices are shown.

It will be appreciated that the access device 104, the spectrum selector 108, the unlicensed transceiver 112, and the licensed transceiver 116 may be software, hardware, or a combination thereof, and may be one or more physical or logical devices. Likewise, the access device 106, the spectrum selector 110, the unlicensed transceiver 114, and the licensed transceiver 118 may be software, hardware, or a combination thereof, and may be one or more physical or logical devices.

The access devices 104 and 106 receive communications from, and/or transmit communications to, the spectrum selector 108 or 110. The access devices 104 and 106 may be, for example, a telephone, a computer, a service hub, a transceiver, or any other device configured to transmit communications to, and/or receive communications from, the spectrum selector 108 or 110.

The spectrum selectors 108 and 110 transmit communications to, and/or receive communications from, the access device 104 or 106, the unlicensed transceiver 112 or 114, and/or the licensed transceiver 116 or 118. The spectrum selectors 108 and 110 determine whether communications will be transmitted from the unlicensed transceiver 112 or 114 or whether the communications will be transmitted from the licensed transceiver 116 or 118. Likewise, the spectrum selectors 108 and 110 determine if communications are being received from the unlicensed transceiver 112 or 114 or whether the communications are being received from the licensed transceiver 116 or 118.

The spectrum selectors 108 and 110 can determine whether to transmit communications to the unlicensed transceiver 112 or 114 or the licensed transceiver 116 or 118 based upon multiple configurations. These configurations may include a switching mode and a capacity mode.

In the switching mode, the spectrum selectors 108 and 110 transmit communications based on best effort services or guaranteed services. For example, the spectrum selector 108 may transmit all communications to the unlicensed transceiver 112 until an interference event occurs. Then, the spectrum selector 108 may transmit communications for guaranteed services using the licensed transceiver 116 and transmit communications for other services via the unlicensed transceiver 112. When guaranteed services are covered, additional licensed spectrum can be used. An interference event occurs when interference is at or within a specified level, thereby reducing or eliminating the effectiveness or ability to transmit and/or receive communications. The interference may include spectrum interference and/or interference at a transceiver or other device. Interference may be caused by radio signals, engines, noise, and other sources.

Alternately, the spectrum selectors 108 and 110 may transmit all communications to the unlicensed transceiver 112 or 114 and use the licensed transceiver 116 or 118 for all communications when interference exists for the unlicensed transceiver. Alternately, the licensed transceivers 116 and 118 may be used as the primary transceivers, and the unlicensed transceivers 112 and 114 may be used as secondary transceivers.

In the capacity mode, the spectrum selectors 108 and 110 transmit communications using the unlicensed transceivers 112 or 114 until a capacity event occurs. Then, the spectrum selectors 108 and 110 may transmit part or all of the communications via the licensed transceivers 116 or 118. Alternately, the licensed transceivers 116 and 118 may be used as the primary transceivers, and the unlicensed transceivers 112 and 114 may be used as the secondary transceivers. A capacity event occurs when capacity is at or within a specified range of being completely used. The capacity may include spectrum capacity and/or availability and/or availability of a transceiver or other device. A capacity event may occur, for example, when the communication system 102 has too many access devices using capacity, and a call is dropped or fails.

The spectrum selectors 108 and 110 may be configured to use the maximum capacity available for both licensed and unlicensed spectrum and intelligently and dynamically assign traffic to licensed and/or unlicensed spectrum based on use, availability, interference, and other factors. Other configurations may include triggers or events that result in the spectrum selectors 108 and 110 switching from a normal mode identified above to a high capacity mode in which it uses more capacity from other sources. Such triggers or events can be interference based, due to prediction of higher capacity requirements based on traffic characteristics, or based on other events.

The spectrum selectors 108 and 110 receive communications from the unlicensed transceivers 112 and 114 and the licensed transceiver 116 or 118. The spectrum selectors 108 and 110 determine from which transceiver the communications are being received, receive the communications using the appropriate protocol, and transmit the communications to the access device 104 or 106. The spectrum selectors 108 and 110 may be configured to use encryption, de-encryption, coding, decoding, modulation, and/or de-modulation. The spectrum selectors 108 and 110 also may be configured to use inverse multiplex asynchronous transfer mode (IMA) protocols to transfer and/or receive communications.

The unlicensed transceivers 112 and 114 are any transceivers configured to transmit and/or receive communications in unlicensed spectrum. Unlicensed spectrum may include UPCS, ISM, UNII, and other unlicensed bands.

The licensed transceivers 116 and 118 are any transceivers configured to transmit and/or receive communications in licensed spectrum. Licensed spectrum may include MMDS, PCS, and other licensed bands.

The network 120 is any network configured to carry communications to or from the unlicensed transceivers 112 and 114 or to or from the licensed transceivers 116 and 118. The network 120 may include hardware, software, or a combination thereof. For example, the network 120 may include wireless switches and/or antennas.

The system of FIG. 1 operates as follows. In a first example, the access device 104 transmits communications to the spectrum selector 108. The spectrum selector 108 determines that unlicensed spectrum is available within the communication system 102. The spectrum selector 110 processes the communication if needed. For example, the spectrum selector 110 may encrypt, modulate, or format the communications for a particular protocol. The spectrum selector 108 transmits the communications to the unlicensed transceiver 112, and the unlicensed transceiver 112 transmits the communications over the network 120.

The unlicensed transceiver 114 receives the communications over the unlicensed spectrum and transmits the communications to the spectrum selector 110. The spectrum selector 110 monitors the unlicensed transceiver 114 and the licensed transceiver 118 and determines that communications are being received from the unlicensed transceiver. The spectrum selector 110 receives the communications. The spectrum selector 110 processes the communications if required, such as for de-encrypting, de-modulating, or formatting the communication to a selected format or protocol, or otherwise processing the communications. The spectrum selector 110 then transmits the communications to the access device 106.

In another example, the access device 106 transmits communications to the spectrum selector 110. The spectrum selector determines that the communications should be transmitted over licensed spectrum. The spectrum selector 108 processes the communications if needed, for example, by encrypting, modulating, or formatting for a protocol the communications. The spectrum selector 110 transmits the communications to the licensed transceiver 118, and the licensed transceiver transmits the communications over licensed spectrum via the network 120.

The licensed transceiver 116 receives the communications over the licensed spectrum and transmits the communications to the spectrum selector 108. The spectrum selector 108 monitors the licensed transceiver 116 and the unlicensed transceiver 112 and determines that communications are being received from the licensed transceiver. The spectrum selector 108 receives the communications and, if needed, processes the communications. For example, the spectrum selector 108 may de-encrypt, de-modulate, reformat the communications, or otherwise process the communications. The spectrum selector 108 then transmits the communications to the access device 104.

In another example, the access device 104 has multiple associated access devices transmitting communications to the spectrum selector 108. The spectrum selector determines that the communications should be transmitted over unlicensed spectrum. The spectrum selector 108 transmits the communications to the unlicensed transceiver 112 to be transmitted via the network 120. The unlicensed transceiver 112 transmits the communications over unlicensed spectrum.

While the spectrum selector 108 is routing communications to the unlicensed transceiver 112 for transmission via unlicensed spectrum, the spectrum selector determines that a capacity event exists. In this example, the spectrum selector 108 determines that the unlicensed transceiver 112 is transmitting at 90% of its capacity. In other examples, lack of capacity in a spectrum may exist. Other examples exist. The spectrum selector 108 transmits a portion of the communications to the unlicensed transceiver 112 and a portion of the communications to the licensed transceiver 116. The unlicensed transceiver 112 transmits via unlicensed spectrum the communications that it received from a spectrum selector 108. Likewise, the licensed transceiver 116 transmits via licensed spectrum the communications it received from spectrum selector 108.

In another example, the access device 104 transmits communications to the spectrum selector 108. The spectrum selector 108 determines that a portion of the communications must be transmitted via guaranteed services, and a portion of the communications can be transmitted via best effort services. The spectrum selector 108 transmits the communications that can be transmitted as best effort services to the unlicensed transceiver 112. The spectrum selector 108 transmits the communications for guaranteed services to the licensed transceiver 116. The unlicensed transceiver 112 transmits the communications via unlicensed spectrum for the best effort services. The licensed transceiver 116 transmits the communications for the guaranteed services via licensed spectrum.

In another examples the access device 104 has multiple associated access devices. The access device 104 transmits communications to the spectrum selector 108. The spectrum selector 108 monitors the unlicensed spectrum and the licensed spectrum and determines that an interference event exists on the unlicensed spectrum. In this example, the interference event is noise in the unlicensed spectrum. Other examples exist. The spectrum selector 108 transmits the communications to the licensed transceiver 116. The licensed transceiver 116 transmits the communications via licensed spectrum.

In another example, the access device 104 transmits communications to the spectrum selector 108. The spectrum selector 108 determines that both the unlicensed spectrum and the licensed spectrum have capacity. The spectrum selector 108 uses IMA protocols to transmit a portion of the communications to the unlicensed transceiver 112 and to transfer another portion of the communications to the licensed transceiver 116. The unlicensed transceiver 112 transmits the first portion of the communications via unlicensed spectrum over the network 120. The licensed transceiver 116 transmits the second portion of the communication via licensed spectrum over the network 120.

The unlicensed transceiver 114 receives the first portion of the communications via the unlicensed spectrum and transmits the communications to the spectrum selector 110. The licensed transceiver 118 receives the second portion of the communications via the licensed spectrum and transmits the communications to the spectrum selector 110. The spectrum selector uses the IMA protocol to recombine the communications and to transmit the communications to the access device 106.

Figure 2:
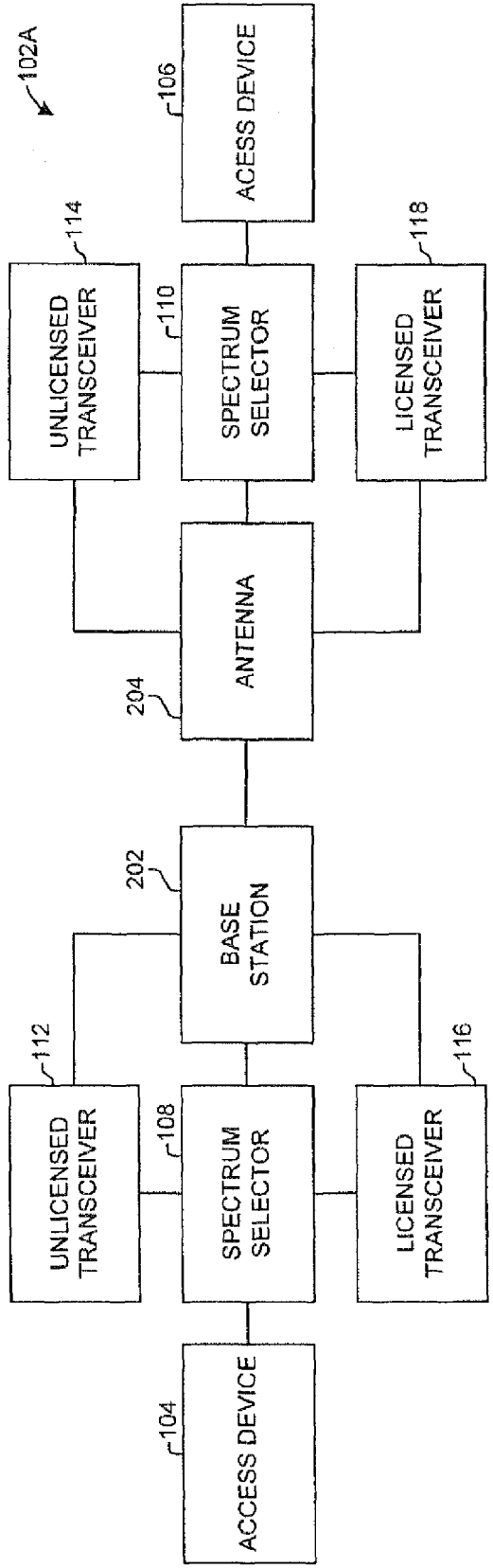
FIG. 2 is a block diagram of another communication system in accordance with an embodiment of the present invention.

FIG. 2 depicts an exemplary embodiment of a communication system 102A of the present invention in which the network comprises a base station 202 and an antenna 204. In this embodiment, the spectrum selector 108, the unlicensed transceiver 112, and the licensed transceiver 116 exist at or near, i.e. within a range of, the base station 202. In addition, the spectrum selector 110, the unlicensed transceiver 114, and the licensed transceiver 118 exist at or near the antenna 204 at a receiving location.

The base station 202 is any switch configured to control transmitting and/or receiving wireless communications. The base station 202 is well known in the art.

The antenna 204 is any device configured to transmit and/or receive wireless communications via spectrum. The antenna 204 is well known in the art.

Figure 3:
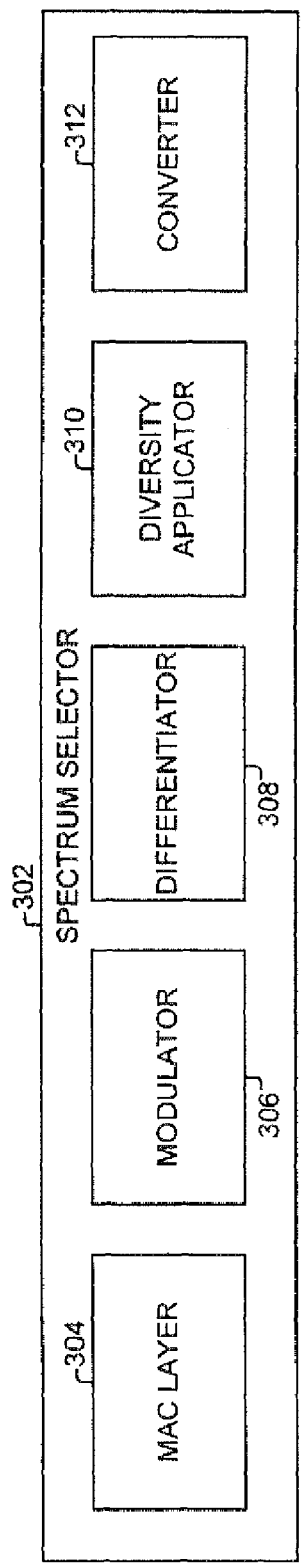
FIG. 3 is a block diagram of a spectrum selector in accordance with an embodiment of the present invention.

FIG. 3 depicts an exemplary embodiment of a spectrum selector 302. The spectrum selector 302 is configured to integrate communications at a service level. Thus, for example, the spectrum selector 302 may determine that voice communications are to be transmitted on licensed spectrum while internet related services are to be transmitted on unlicensed spectrum. In addition, for example, media data may be transmitted over licensed spectrum. Other examples exist.

The spectrum selector 302 may mix the transmission and/or reception of wireless communications on unlicensed spectrum and/or licensed spectrum. The spectrum selector 302 dynamically prioritizes the use of unlicensed spectrum and/or licensed spectrum on a real time basis. The spectrum selector 302 may determine that particular communications are to be transmitted over a particular spectrum, depending on whether the communications are guaranteed services, best effort services, or otherwise identified. For example, communications for guaranteed services may be configured to be transmitted over licensed spectrum only. Whereas, communications for best effort services may be configured to be transmitted over unlicensed spectrum and/or licensed spectrum as capacity, interference, and availability events occur.

Also, these configurations may be determined based on any type of service requirement or service agreement. For example, a service agreement with a specified user may require all of that user's communications to be transmitted via licensed spectrum. This enables the spectrum selector 302 to add value to the transmission of the communications based on a service level.

The spectrum selector may comprise a media access control (MAC) layer 304. The spectrum selector 302 may comprise one or more of a modulator 306, a differentiator 308, a diversity applicator 310, and/or a converter 312.

The MAC layer 304 may control access of the unlicensed transceiver and the licensed transceiver and control formatting communications using various protocols, including IMA. For example, the MAC layer 304 may control transmitting communications to the unlicensed transceiver using protocols designed for UPCS spectrum or transmitting communications to the licensed transceiver using protocols designed for MMDS spectrum.

The MAC layer 304 allocates communication resources, such as spectrum use, transmission duration, transmission power, and transmission bandwidth. For example, the MAC layer 304 may control how much spectrum is used, at what power, and for how long. The MAC layer 304 enables the access device 104 to dynamically split, combine, and/or direct resources over the unlicensed spectrum and the licensed spectrum.

The MAC layer 304 initiates and terminates all communication sessions. Thus, the MAC layer 304 receives, processes, and responds to control signals to set up links for reception of communications. The MAC layer 304 also generates control signals to set up links for transmission of communications and processes response control signals.

The MAC layer 304 also generates control signals to other devices, such as the modulator 306, the differentiator 308, the diversity applicator 310, and the converter 312, specifying operations, such as when and how to multiplex or demultiplex one or more communications. The MAC layer 304 may generate control signals to other components of the spectrum selector 302. For example, the MAC layer 304 may generate a control signal to the modulator 306 identifying modulation or demodulation parameters or to a signal processor (not shown) identifying formatting, such as an encryption technique.

The MAC layer 304 controls all inbound and outbound communications activity. The MAC layer 304 controls all activities of the modulator 306, the differentiator 308, the diversity applicator 310, and the converter 312. The MAC layer 304 determines what protocol, spectrum, or signal type will be used at the spectrum selector 302. For example, the MAC layer 304 may be configured to control reception of wireline communications using various protocols from the unlicensed transceiver and the licensed transceiver, to control combining the communications received over different access media if needed into one logical data stream, to control demultiplexing transmit data into separate streams sent over different access media, and to control the reformatting of the communications as needed for transmission to, or reception by, premise equipment LAN access device 104 or a switch.

The MAC layer 304 can be configured to use past performance of unlicensed spectrum and licensed spectrum to dynamically determine over which spectrum current communications will be transmitted. The past performance is used to predict real time spectrum capacity and interference events and needs.

The modulator 306 is configured to modulate communications for transmission. On the receiving side, the modulator 306 is configured to de-modulate communications. The modulator 306 may use any type of modulation, including digital and analog modulation.

The differentiator 308 is configured to multiplex communications or otherwise combine the communications for optimization of available capacity. On the receiving end, the differentiator 308 is configured to de-multiplex or otherwise reformat combined communications. The differentiator 308 is configured to combine spectrums, thereby enabling greater capacity use.

The differentiator 308 is configured to provide different levels of service for different types of communications. In one embodiment, the differentiator 308 comprises an IMA differentiator configured to format a portion of a communication for transmission over a first spectrum and to format a second portion of the communication for transmission over a second spectrum. The first and second spectrum may both be in licensed spectrum or both may be in unlicensed spectrum. Alternately, the first spectrum may be in licensed or unlicensed spectrum, and the second spectrum may be in the other spectrum. The IMA differentiator also is configured to recombine communications that have been split between different spectrum bands.

The differentiator 308 can be configured to transmit and receive communications from point to point and point to multipoint. For example, communications may be transmitted over licensed spectrum from one point and over unlicensed spectrum from another point. The differentiator 308 is configured to receive both sets of communications and to identify the access devices that are to receive the respective communications.

The diversity applicator 310 applies diversity techniques to communications. Diversity effects redundancy in a network. For example, if a spectrum currently being used fades, another spectrum is selected for redundancy. Other diversity techniques, for example, changes a channel of a wireless communication either on request by a user or dynamically upon sensing noise or other problems on a current channel. Diversity techniques are well known in the art.

The converter 312 is configured to upshift and downshift communications. Upshifting and downshifting communications may include changing the eater frequency of a signal, either up or down. For example, a modulated signal having a carrier frequency of 400 mega-hertz (MHz) may be upshifted to 2.5 giga-hertz (GHz) from transmission in the MMDS bands. Likewise, the same signal may be downshifted to 400 MHz from processing at the receiver. (that's the differentiator action)

Figure 4:
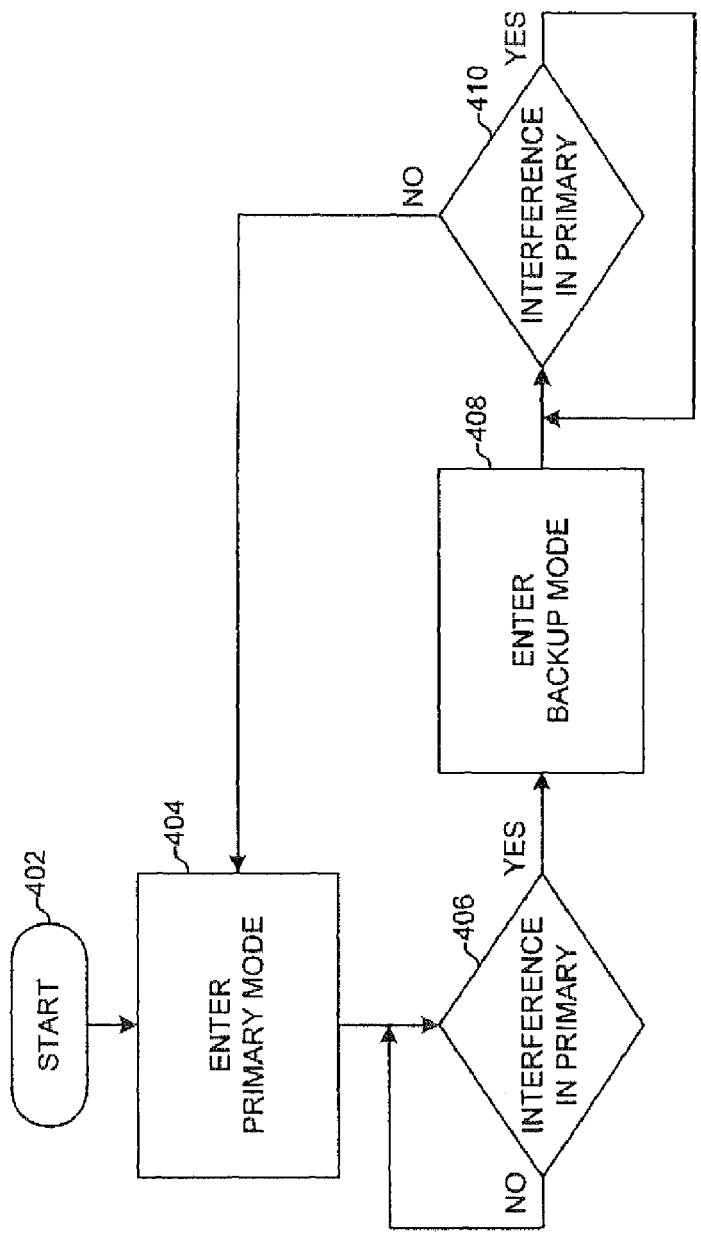
FIG. 4 is a flow diagram of a mode selection process in a communication system in accordance with an embodiment of the present invention.

FIG. 4 depicts an exemplary embodiment of a method for changing between the use of different spectrum bands in a switching mode. The method starts at 402. At 404, the primary mode is entered. In this example, the primary mode is a switching mode using unlicensed spectrum as the default spectrum. If there is no interference in the primary mode at 406, the system stays in the primary mode. If interference exists in the primary mode at 406, the system enters the back up mode at 408. In this example, the backup mode is the switching mode using licensed spectrum. If there continues to be interference in the primary mode at 410, the system maintains use of the backup mode. If there is no interference in the primary mode at 410, the system enters the primary mode at 404.

Those skilled in the art will appreciate that variations from the specific embodiments disclosed above are contemplated by the invention. The invention should not be restricted to the above embodiments, but should be measured by the following claims.

What is claimed is:
1. A system for selecting spectrum comprising:
a licensed spectrum transceiver configured to transmit communications over licensed spectrum;
an unlicensed spectrum transceiver configured to transmit communications over unlicensed spectrum; and
a spectrum selector configured to select one of the licensed transceiver and the unlicensed transceiver to transmit all first communications prior to an interference event affecting the one of the licensed transceiver and the unlicensed transceiver;
wherein the spectrum selector is configured to select the other one of the licensed transceiver and the unlicensed transceiver to transmit at least some of the first communications in response to the interference event.

2. The system of claim 1, wherein:
the spectrum selector is configured to select the one of the licensed transceiver and the unlicensed transceiver to transmit some of the first communications, and to select the other one of the licensed transceiver and the unlicensed transceiver to transmit the remainder of the first communications in response to the interference event.

3. The system of claim 2, wherein:
the first communications comprise guaranteed service communications and best effort communications; and
the spectrum selector is configured to select the licensed transceiver to transmit at least all of the guaranteed service communications, and to select the unlicensed transceiver to transmit at least some of the best effort communications in response to the interference event.

4. The system of claim 3, wherein:
the spectrum selector is configured to select the licensed transceiver to transmit at least some of the best effort communications in response to the interference event.

5. The system of claim 1, wherein:
the interference event comprises signal interference attaining a specified level.

6. The system of claim 1, wherein:
the spectrum selector is configured to select the one of the licensed transceiver and the unlicensed transceiver to transmit all of the first communications after the interference event.

7. The system of claim 1, wherein:
the spectrum selector is configured to select the other one of the licensed transceiver and the unlicensed transceiver to transmit all of the first communications in response to the interference event.

8. A system for selecting spectrum comprising:
a licensed spectrum transceiver configured to transmit communications over licensed spectrum;
an unlicensed spectrum transceiver configured to transmit communications over unlicensed spectrum; and
a spectrum selector configured to select one of the licensed transceiver and the unlicensed transceiver to transmit all first communications prior to a capacity event affecting the one of the licensed transceiver and the unlicensed transceiver;
wherein the spectrum selector is configured to select the other one of the licensed transceiver and the unlicensed transceiver to transmit at least some of the first communications in response to the capacity event.

9. The system of claim 8, wherein:
the capacity event comprises a capacity of the one of the licensed transceiver and the unlicensed transceiver attaining a specified range.

10. The system of claim 9, wherein:
the capacity of the one of the licensed transceiver and the unlicensed transceiver comprises a capacity of the spectrum associated with the one of the licensed transceiver and the unlicensed transceiver.

11. The system of claim 9, wherein:
the capacity of the one of the licensed transceiver and the unlicensed transceiver comprises an availability of the one of the licensed transceiver and the unlicensed transceiver.

12. A system for selecting spectrum comprising:
a licensed spectrum transceiver configured to transmit communications over licensed spectrum;
an unlicensed spectrum transceiver configured to transmit communications over unlicensed spectrum; and
a spectrum selector configured to dynamically assign portions of first communications to each of the licensed transceiver and the unlicensed transceiver based on at least one operational factor, wherein the at least one operational factor comprises at least one of capacity of the licensed transceiver and the unlicensed transceiver, and interference of the licensed transceiver and the unlicensed transceiver.

13. The system of claim 12, wherein:
the spectrum selector is configured to select the licensed transceiver and the unlicensed transceiver for transmission of at least a portion of the first communications based upon a communication type.

14. The system of claim 13, wherein:
the first communications comprise voice communications and Internet-related communications; and
the spectrum selector is configured to select the licensed transceiver for transmission of the voice communications, and to select the unlicensed transceiver for transmission of the Internet-related communications.

15. The system of claim 12, wherein:
the spectrum selector is configured to select the licensed transceiver and the unlicensed transceiver for transmission of at least a portion of the first communications based upon a service level.

16. The system of claim 15, wherein:
the first communications comprise guaranteed services and best effort services; and
the spectrum selector is configured to select the licensed transceiver for the guaranteed services, and to select either or both of the licensed transceiver and the unlicensed transceiver for the best effort services.

17. The system of claim 12, wherein:
the spectrum selector is configured to select the licensed transceiver and the unlicensed transceiver for transmission of at least a portion of the first communications associated with a user based upon a service agreement with the user.

18. The system of claim 17, wherein:
the service agreement comprises a requirement that all of the first communications associated with the user be transmitted via the licensed spectrum.

19. The system of claim 12, wherein:
the licensed spectrum transceiver is configured to receive second communications over the licensed spectrum;
the unlicensed spectrum transceiver is configured to receive second communications over the unlicensed spectrum; and
the spectrum selector is configured to monitor the licensed transceiver and the unlicensed transceiver to determine which of the licensed transceiver and the unlicensed transceiver is receiving the second communications, and to receive the second communications from the one or both of the licensed transceiver and the unlicensed transceiver receiving the second communications.

* * * * *